Patented Nov. 3, 1953

2,658,058

UNITED STATES PATENT OFFICE 2,658,058

PROCESS FOR MAKING HIGH POLYMERS OF ALPHA-METHYL STYRENE

Thomas E. Werkema, Midland, Mich., assignor to The Dow Chemical Company, Midland, Mich., a corporation of Delaware No Drawing. Application September 29, 1952, Serial No. 312,160

10 Claims. (Cl. 260—93.5)

This invention concerns an improved process for making high polymers of alpha-methyl styrene. It relates more particularly to a process for recovering high polymers of alpha-methyl styrene from a reaction mixture obtained by polymerizing alpha-methyl styrene in contact with an alkali metal as a catalyst, which process permits further use of the alkali metal to form additional amounts of the polymer.

This application is a continuation-in-part of my pending application Serial No. 124,728, filed October 31, 1949.

A method of making solid high polymers of alpha-methylstyrene is described in application Serial No. 124,729, by G. D. Jones, filed October 31, 1949. In brief, the method consists of maintaining alpha-methyl styrene at a temperature between 0° and 30° C., in contact with metallic sodium until the desired degree of polymerization is obtained. The polymer is recovered free of the sodium catalyst by precipitation from a solution of the polymer in monomeric alpha-methyl styrene with a lower aliphatic alcohol such as methanol, ethanol, or isopropanol, or by dissolving the solid polymer in an aromatic hydrocarbon solvent such as benzene, toluene, xylene, or ethylbenzene, and diluting the solution with a lower aliphatic alcohol to precipitate the polymer and destroy the catalyst, e. g. by reaction of the alcohol with the sodium to form a sodium alcoholate.

A method of making a normally solid moldable homopolymer of alpha-methyl styrene by polymerizing the same in the presence of an alkali metal other than sodium, e. g. potassium or lithium, or mixtures or alloys of potassium and lithium with each other, or a mixture or an alloy of sodium with one or both of the metals potassium and lithium, is described in my application Serial No. 312,159, filed concurrently herewith.

When alpha-methyl styrene is polymerized in the presence of an alkali metal, e. g. metallic sodium, as a catalyst, a portion of the alkali metal appears to chemically combine with the alpha-methyl styrene to initiate, or catalyze, the polymerization reaction. The alkali metal consumed in initiating the polymerization reaction remains in the polymer, apparently attached to terminal carbon atoms of the polymer chains. The proportion of the alkali metal chemically combined in the polymer, is dependent for the most part upon the length of the polymer chains, i. e. the molecular weight of the polymer, formed in the reaction. When the polymer is separated from the excess of non-chemically combined alkali metal employed as catalyst by precipitating the polymer from solution with a lower aliphatic alcohol, the alkali metal that is chemically combined in the polymer also reacts with the alcohol and is removed therefrom. The polymer may be further purified by repeated solution and precipitation to remove residual traces of the alkali metal or salts thereof. The polymeric alpha-methyl styrene is thus obtained as a product of high purity, free or substantially free of alkali metal, and possesses physical properties which render it suitable for many purposes, e. g. as insulating material for electricity at high frequencies. However, the disadvantages of such a method of purifying the polymer are that it involves handling large quantities of volatile organic solvents relative to the amount of the polymer which is purified, and is expensive, particularly when applied to production of the polymer on a commercial scale. It is apparent that a process of separating the polymer from the excess, i. e. the non-chemically combined, alkali metal used as catalyst by a procedure which avoids the use of volatile organic liquids or solvents and which does not destroy the free alkali metal would not only render production of the polymer less costly, but would permit the unused alkali metal to be again employed in the process to form a further amount of the polymer.

It has now been found that the polymeric alpha-metal styrene can readily be separated from the non-chemically combined alkali metal, e. g. metallic sodium, used as a polymerization catalyst by a procedure which involves polymerizing alpha-methyl styrene in the presence of a granular alkali metal catalyst at a temperature of from 0° to 30° C., until a syrupy solution of the polymer in monomeric alpha-methyl styrene is obtained, filtering the solution and recovering the polymer from the filtered solution by distilling off the unreacted alpha-methyl styrene. In a preferred alternative procedure, the polymerization reaction is carried out until a solution containing at least 15 per cent, suitably from 15 to 35 per cent, by weight of polymer is obtained, then withdrawing a portion of the solution through a filter such as a porous metal plate or a metal screen, so that the free alkali metal catalyst remains in the residual reaction mixture, distilling the unreacted alpha-methyl styrene from the polymeric product in the filtered solution, adding a new charge of monomeric alpha-methyl styrene to the residual reaction mixture and continuing the process. The alpha-methyl styrene recovered in the process may be used in succeeding reactions.

Surprisingly, it has been found that although the polymer thus recovered contains chemically combined alkali metal, e. g. sodium, the polymer has dielectric properties equally as good as the polymer recovered by precipitation with an alcohol. In general, the solid high polymers of alpha-methyl styrene having a molecular weight corresponding to an intrinsic viscosity in toluene of 0.3, or greater, are recovered as substantially colorless products containing chemically combined, alkali metal, e. g. sodium in amount of about 0.06 per cent by weight or less. The filtration residue, or residual reaction mixture, containing particles and granules of the alkali metal is reused in the process together with further amounts of alpha-methyl styrene to form an additional amount of the polymeric alpha-methyl styrene of high molecular weight.

In carrying out the polymerization, the mixture of the alkali metal and the alpha-methyl styrene is usually agitated to maintain the alkali metal dispersed in the reaction mixture. Since the alkali metal is consumed in the reaction, the granules of the alkali metal gradually become smaller. Also, due to mechanical attrition of the granules of the alkali metal catalyst, a wearing away of the granules occurs. Accordingly, the reaction mixture contains extremely fine dust-like particles of the catalyst together with larger pieces or granules of the same. The term "particle" as used herein means extremely fine dust-like pieces of the alkali metal catalyst having dimensions of approximately 0.1 millimeter or less. The term "granule" as used herein means pieces of the alkali metal catalyst having dimensions of approximately 0.5 millimeter or greater. The term "high polymer" is used herein to mean a homopolymer of alpha-methyl styrene having a molecular weight corresponding to an intrinsic viscosity in toluene of 0.3, or greater. Methods of determining the intrinsic viscosity of high polymers e. g. polystyrene, are well known and need not be discussed here. The homopolymers of alpha-methyl styrene having an intrinsic viscosity in toluene of 0.3 or greater have molecular weights of approximately 30,000 or greater. A solution of toluene containing 10 per cent by weight of such polymer has an absolute viscosity of 5 centipoises, or greater, at 25° C.

Suitable alkali metals which may be employed as the catalyst for effecting the polymerization of alpha-methyl styrene in bulk at a temperature between 0° and 30° C. to form a normally solid moldable homopolymer are sodium, potassium and lithium. Mixtures or alloys of any two or more of such alkali metals with each other may also be used. In this connection it may be mentioned that the presence of even a small proportion, e. g. one per cent by weight or less of either, or both, of the elements potassium or lithium in admixture or alloyed with sodium, results in a greater rate of polymerization than is obtained by use of sodium alone as the catalyst under otherwise similar reaction conditions Such metal mixtures, or alloys, may contain larger proportions, e. g. from 1 to 99 per cent by weight of potassium, or lithium, or both.

The molecular weight of the polymer which is formed appears to be independent of the proportion of the monomeric alpha-methyl styrene which is polymerized or of the relative proportion of the alkali metal used as a catalyst, but is dependent for the most part upon the temperature at which the polymerization is carried out and the kind, or kinds of alkali metal used as a catalyst. Under similar polymerization temperature conditions sodium gives homopolymers of alpha-methyl styrene of highest molecular weight and results in the lowest rate of polymerization; potassium gives polymers of slightly lower molecular weight and causes the greatest rate of polymerization; lithium gives polymers of lowest molecular weight and results in a lower rate of polymerization than is obtained with potassium, but a substantially faster rate of polymerization than is obtained with sodium. In practice mixtures or alloys of a major proportion by weight of sodium and a minor proportion of one or both of the metals potassium and lithium are preferably used as catalysts, since such a catlytic mixture or alloy is less expensive per pound than pure potassium or lithium, causes greater rate of polymerization than is obtained with sodium alone as the catalyst under otherwise similar reaction conditions, and produces a polymer of alpha-methyl styrene which is of higher molecular weight than is obtained by use of either potassium or lithium as the catalyst under otherwise similar conditions. However, each of the metals sodium, potassium and lithium are effective catalysts for the polymerization of alpha-methyl styrene at temperatures between 0° and 30° C. to produce homopolymers of high molecular weight, and they may satisfactorily be employed individually, or as mixtures or alloys of any two or more with each other.

The proportion of the alkali metal, suitably metallic sodium, to be employed as a catalyst in the process may vary within the wide limits, e. g. from the minor but effective proportion of the alkali metal required to catalyze the polymerization reaction to 10 per cent by weight or more of the weight of the alpha-methyl styrene. The alkali metal catalyst is usually employed in amount corresponding to from 0.2 to 10 per cent by weight of the alpha-methyl styrene used, although greater proportions of the catalyst may be employed.

The rate at which the polymerization reaction proceeds is also dependent in part upon the degree of subdivision of the alkali metal catalyst, e. g. metallic sodium. In general, a faster rate of polymerization of the alpha-methyl styrene is obtained when a major proportion of the metallic catalyst, e. g. sodium, is composed of granules smaller than 2 millimeters in any diameter than is obtained when larger sodium granules, e. g. granules of 4 millimeters in diameter or larger, are employed as a catalyst for the polymerization under otherwise similar reaction conditions. The alkali metal catalyst is usually employed in a granular form such that the principal part of the catalyst is composed of granules smaller than 5 millimeters in any dimensions. Beads or rounded granules of the alkali metal catalyst having a diameter of from 1 to 4 millimeters are usually employed. However, the alkali metals or mixtures or alloys of the same as hereinbefore mentioned, are effective in causing the polymerization regardless of the particle, or granule, size, or physical form, in which it is employed, and larger or smaller particles or granules of the catalyst than those just mentioned can be used.

The alkali metal catalysts or mixtures or alloys of the same may be prepared in finely divided, granular, or powdered, form by known procedures. Thus, metallic sodium may be dispersed in hot benzene, toluene, xylene, ethylbenzene, or kerosene, or other inert liquid aliphatic or aromatic, hydrocarbons, with vigorous agitation, and then cooled to solidify the sodium metal. The alkali metals may also be sprayed through suitable orifices or nozzles, or extruded through fine orifices, preferably directly into the reaction mixture so as to avoid contact with air. Alloys of the alkali metals may be prepared in granular form by heating a mixture of any two or more of the alkali metals in an inert organic liquid, e. g. ethylbenzene, or white mineral oil, until the metals are melted then vigorously agitating the mixture and cooling the same to solidify the metallic globules.

The alpha-methyl styrene employed in the reaction should be substantially free of inert material, i. e. it should have a purity of 95 per cent or more. Solid polymers of high molecular weight, i. e. having a molecular weight corresponding to an intrinsic viscosity in toluene of 0.4, or greater, may be prepared from alpha-methyl styrene containing approximately 5 per cent by weight of isopropylbenzene, or ethylbenzene, as inert diluent. However, it is important that the alpha-methyl styrene be protected against prolonged contact with air, or oxygen, prior to, and during the polymerization reaction in order to obtain polymers of greatest molecular weight. The presence of freely absorbed oxygen, or of compounds containing the carbonyl group, e. g. aldehydes or ketones, in admixture with the alpha-methyl styrene increases the tendency toward the formation of a polymer having a molecular weight lower than is obtained in the absence of such substances and also tends to inhibit or curtail the polymerization reaction. The alpha-methyl styrene is usually distilled just prior to polymerization of the same, although satisfactory results have been obtained by distilling the alpha-methyl styrene and storing it for periods of time of one month or less, out of contact with air, or oxygen, prior to use.

The polymerization reaction is usually carried out in the absence of air or oxygen by contacting the mixture with an inert gas such as nitrogen, methane, or helium. The polymerization reaction may be carried out in vacuum, or in contact with vapors of the alpha-methyl styrene, by sealing the reactants under vacuum in a suitable vessel, or by maintaining the mixture under vacuum while carrying out the polymerization reaction. Usually the alpha-methyl styrene and the alkali metal catalyst, e. g. sodium, in the desired proportions, are placed in a suitable reaction vessel. The mixture is agitated and is maintained at a temperature between 0° and 30° C., preferably from 10° to 25° C., until from 15 to 25 per cent of the alpha-methyl styrene is polymerized. The alkali metal employed as catalyst is separated from the solution of polymer in monomeric alpha-methyl styrene by passing the solution through a suitable filter such as a metal screen, a fritted glass filter, a porous ceramic plate, a porous metal plate, or a bed of an inert finely divided solid material such as diatomaceous earth, silica, fuller's earth, activated charcoal, powdered metal, etc., or a bed of fibrous material, e. g. asbestos, or glass wool, which filter has a porosity such as to permit flow of the solution therethrough, but effectively removes all or nearly all of the suspended particles of the alkali metal catalyst. In this connection filters such as a fritted glass plate having an average pore size of 40 microns, a porous stainless steel plate having an average pore size of 20 microns and a 70 mesh per inch standard Tyler metal screen followed by a bed of diatomaceous earth, have given satisfactory results. A porous metal filter plate, e. g. of stainless steel, or a metal screen, may be placed over a valved outlet in a lower portion of a reaction vessel so that the filter plate or screen is in contact with the reaction mixture and the valve is on the discharge side of the filter, whereby the solution of polymer in monomeric alpha-methyl styrene may be withdrawn from the reaction vessel through the porous plate, or screen leaving the granules, or particles, of the alkali metal catalyst in the vessel. Two or more of the filtering means described may be used in conjunction with each other, e. g. a metal screen and a bed of diatomaceous earth.

In a preferred practice, a charge of monomeric alpha-methyl styrene, together with granules of an alkali metal catalyst as hereinbefore mentioned, suitably in the form of beads or granules having a diameter of from 1 to 4 millimeters, is placed in a reaction vessel equipped with a stirrer and means for heating or cooling the mixture. A filter, e. g. a metal screen having a mesh size or openings such as to retain the granules of the alkali metal catalyst in the vessel, is placed over an outlet for withdrawing liquor from the reaction vessel so that the relatively large granules of the alkali metal catalyst are retained in the reaction vessel while the liquor and the extremely fine dust-like particles of the catalyst are readily passed therethrough. The mixture of monomeric alpha-methyl styrene and catalyst is stirred and maintained at a reaction temperature of from 0° to 30° C. preferably from 10° to 25° C., until from 15 to 35, preferably from 18 to 25, per cent by weight of the alpha-methyl styrene is polymerized. The principal part of the reaction liquor, together with the extremely fine dust-like particles of suspended alkali metal, is withdrawn from the vessel through the screen via the outlet, whereby the granules of the alkali metal catalyst are retained in the reaction vessel, i. e. in the residual reaction mixture. A new charge of monomeric alpha-methyl styrene is added to the vessel and is polymerized by similar procedure while in contact with the alkali metal catalyst. The solution of polymer in monomeric alpha-methyl styrene containing the dust-like particles of catalyst, which solution is withdrawn from the reaction vessel, is usually mixed with a filtering aid such as a diatomaceous earth, fuller's earth, activated charcoal, powdered metal, or a mixture of such agents, and is filtered to remove the solid materials. The filtered solution is heated, suitably in vacuum to distill and separate the volatile components, principally unreacted alpha-methyl styrene, from the polymer. The filtered solution is usually heated with gradual reduction of pressure on the system until the residue, i. e. the polymeric product, is being heated at a temperature of from 180° to 280° C. at an absolute pressure of 50 millimeters or less. Thereafter, the polymeric product is cooled and is crushed to a granular form suitable for molding. The alpha-methyl styrene recovered in the process may be used in succeeding reactions.

The process herein disclosed may be carried out in continuous manner by feeding alpha-methyl styrene into contact with granules of an alkali metal catalyst dispersed in a reservoir of a liquid reacting mixture comprised essentially of alpha-methyl styrene, polymeric alpha-methyl styrene and said catalyst, maintained at a polymerization temperature and withdrawing reaction liquor from the reservoir at a rate corresponding approximately to the rate of feed to the reaction. The reaction liquor or solution of polymer in monomeric alpha-methyl styrene, is preferably withdrawn through a filter, e. g. a porous stainless steel plate, or a metal screen, in contact with the liquid reaction mixture in the polymerization vessel so that the granules of the catalyst remain in the vessel, and which filter permits the dust-like particles of the metallic catalyst to pass therethrough. The reaction liquor containing the dust-like particles of the catalyst is separated from the residual catalyst, e. g. by filtering through a bed of diatomaceous earth. The polymer is recovered from the filtrated solution by distilling off the monomeric alpha-methyl styrene. The latter is recycled in the process to form a further amount of the polymer. The filtered liquor, i. e. the solution of polymeric alpha-methyl styrene in monomer, may be fed to a devolatilizing zone where it is heated under reduced pressure, e. g. at temperatures of from 180° to 280° C. at an absolute pressure of 50 millimeters or less, to distill and separate the alpha-methyl styrene from the polymer. The heat-plastified polymer and the alpha-methyl styrene are separately withdrawn from the devolatilizing zone. The polymer is cooled and is crushed to a granular form suitable for molding. The alpha-methyl styrene recovered in the process may be recycled to the reaction. The process is continued until the alkali metal catalyst is substantially consumed in the reaction or until the rate of polymerization obtained in the process is undesirably low. However, additional amounts of one or more of the alkali metal catalysts may be added to the reaction mixture to replace that consumed in the reaction. In carrying out the process in continuous manner as just described, the rate of feed to the reaction is usually controlled so that a solution containing from 18 to 25 weight per cent of the polymer in monomeric alpha-methyl styrene can be withdrawn from the reaction zone or reservoir, since solutions of such concentration of the polymer in monomer are more easily separated from the dispersed alkali metal catalyst than are solutions of greater concentration, although solutions of about 35 weight per cent concentration are operable in the process.

The following examples illustrate ways in which the principle of the invention has been applied, but are not to be construed as limiting the invention.

*Example 1*

A charge of approximately 5,000 grams of freshly distilled alpha-methyl styrene, together with 130 grams of finely divided metallic sodium as polymerization catalyst, was sealed in a glass vessel. The mixture was agitated and maintained at a temperature of 10° C., over a period of 123 hours. The reaction mixture was a viscous solution. It was filtered through a fritted glass filter having an average pore size of approximately 40 microns, to remove the particles of sodium metal. The polymer was recovered from the filtered solution by distilling off the unreacted alpha-methyl styrene in vacuum and thereafter heating the residue to a temperature of 190° C., at an absolute pressure of 4 millimeters of Hg, over a period of 2 hours, then cooling the residue. There was obtained 846 grams of a clear colorless brittle solid. The polymer was crushed to a size suitable for molding and a portion of the same molded into standard test pieces. The polymer had a tensile strength of 7,095 pounds per square inch of cross-sectional area, an impact strength of 0.6 inch pound, and a heat distortion temperature of 150° C. A 10 weight per cent solution of the polymer in toluene had an absolute viscosity of 17.7 centipoises at 25° C. The intrinsic viscosity of the polymer in toluene was 0.73.

*Example 2*

By procedure similar to that described in Example 1, a charge of approximately 5,000 grams of freshly distilled alpha-methyl styrene was polymerized in the presence of 125 grams of finely divided metallic sodium as catalyst by maintaining the mixture at a temperature of 10° C., for a period of 144 hours, after which the liquid polymerization mixture was filtered to remove unconsumed sodium and unreacted alpha-methyl styrene was distilled from the filtrate. The residual polymer was molded to form clear colorless test pieces. The polymer had a heat distortion temperature of 151° C., an impact strength of 0.6 pound and a dielectric constant of 2.47. The per cent power factor was 0.021 at a frequency of $10^8$ cycles per second. A 10 weight per cent solution of the polymer in toluene had an absolute viscosity of 23.9 centipoises at 25° C. The intrinsic viscosity in toluene was 0.83.

*Example 3*

A charge of 180 grams of alpha-methyl styrene, together with 14.4 grams of finely divided metallic sodium as catalyst, was sealed in a glass pressure bottle. The mixture was agitated and maintained at a temperature of 10° C. over a period of 45 hours. The reaction mixture was a syrupy solution. It was filtered through a fritted glass filter to remove the sodium. The polymer was recovered by distilling off the unreacted alpha-methyl styrene and heating the residue to a temperature of 180° C., at 2 mm. of Hg absolute pressure, over a period of 2 hours. There was obtained 54 grams of polymer having an intrinsic viscosity in toluene of 0.68. It was compression molded to form a transparent colorless sheet. The polymer had a impact strength of 0.6 inch pound. By measuring the light scattering of dilute solutions of the polymer in methyl ethyl ketone, it was found that the polymer had a molecular weight of approximately 101,000.

*Example 4*

A charge of 200 grams of freshly distilled alpha-methyl styrene, together with 3.6 grams of finely divided metallic sodium was sealed in a glass vessel. The mixture was agitated and maintained at a temperature of about 25° C., i. e. room temperature, over a period of 84 hours. The reaction mixture was yellow colored solid. It was mixed with 1 liter of ethylbenzene to form a solution of the polymer containing particles of the sodium metal catalyst. The solution was decanted and was divided into approximately equal portions. One portion (A) of the solution was filtered through a fritted glass filter having an average pore size of about 40 microns to separate any remaining particles of sodium metal. The filtered solution was heated in vacuum to vaporize and separate the unreacted alpha-methyl styrene from the polymer. The polymer residue was heated to a temperature of 190° C., at an absolute pressure of 2 millimeters over a period of 2 hours to vaporize volatile ingredients, then cooled. The polymer was a clear colorless solid. It was molded into standard test pieces and tested for electrical resistance. The polymer had a dielectric constant of 2.44. The other portion (B) of the polymer solution was poured into 2 liters of agitated formula 30 alcohol, to precipitate the polymer and destroy the catalyst. The polymer was separated by filtering the mixture and was washed with formula 30 alcohol. The polymer was heated to a temperature of 190° C., at an absolute pressure of 2 millimeters over a period of 2 hours to vaporize volatile ingredients, then cooled. The polymer was molded into standard test pieces and was tested for electrical resistance. The polymer had a dielectric constant of 2.47. The per cent power factor at different frequencies for the polymer recovered by each method is reported in the following table.

TABLE

| Polymer | Per Cent Power Factor—Frequency | | | | | | |
|---|---|---|---|---|---|---|---|
| | $10^2$ | $10^3$ | $10^4$ | $10^5$ | $10^6$ | $10^7$ | $10^8$ |
| A | <0.006 | <0.006 | <0.006 | <0.006 | 0.02 | 0.03 | 0.02 |
| B | <0.006 | <0.006 | <0.006 | <0.006 | 0.05 | 0.03 | 0.02 |

*Example 5*

A charge of 615.6 pounds (80 gallons) of alpha-methyl styrene, together with 25 pounds of metallic sodium as catalyst was placed in a reaction vessel equipped with a stirrer and means for heating or cooling the charge, which vessel had previously been flushed with nitrogen. The metallic sodium employed in the experiment was in the form of rounded granules, principally of from 1 to 4 millimeters in diameter. The granules of sodium metal were suspended in toluene to avoid contact with air, but were washed with alpha-methyl styrene to free them of toluene prior to use. The reaction vessel was equipped with a valved inlet for feed of material to the vessel and a valved outlet for withdrawing reaction liquid from said vessel. The outlet was below the surface of the liquid in the reaction vessel. A stainless steel metal screen having a pore size of 0.012 inch (0.3 millimeter) made of wire having a diameter of 0.008 inch, was placed over the outlet in the vessel. The screened outlet permitted reaction liquor containing dust-like particles of the metallic sodium to be withdrawn from the reaction vessel leaving the granules of metallic sodium in the vessel. After, charging the monomeric alpha-methyl styrene and the granular sodium metal to the reaction vessel, the mixture was stirred and was maintained at a temperature of 15° C. over a period of 288 hours. A small portion of the reaction liquor was withdrawn from the vessel at successive intervals of time and was analyzed. The induction time, i. e. time required until polymerization started was 120 hours. The polymerization time was 168 hours. A solution containing approximately 20 per cent by weight of polymeric alpha-methyl styrene was obtained. A total of 378.5 pounds (50 gallons) of the liquor was withdrawn from the reaction vessel through the screened outlet leaving the granules of metallic sodium in the vessel. A new charge of 50 gallons of monomeric alpha-methyl styrene was fed to the reaction vessel into contact with the metallic sodium. The mixture was stirred and was maintained at a temperature of 15° C. until a solution containing approximately 20 per cent by weight of polymer was obtained. Approximately 50 gallons of the reaction liquor was withdrawn from the vessel through the screened outlet leaving the granules of metallic sodium in the vessel. The vessel was filled with a new charge of 50 gallons of monomeric alpha-methyl styrene and the process was continued. The mixture was stirred and was maintained at a temperature of 15° C. over a period of 286 hours. Small portions of the reaction liquor were withdrawn from the vessel at successive intervals of time and were analyzed. The induction time, i. e. the time required until polymerization of this batch of alpha-methyl styrene started, was 150 hours. The polymerization time was 136 hours. The solution contained 20 per cent by weight of polymer. Fifty gallons, approximately 378.5 pounds, of the reaction liquor, was withdrawn from the vessel through the screened outlet. A new charge of 50 gallons of monomeric alpha-methyl styrene was added to the vessel. The liquor which was withdrawn from the reaction vessel contained 0.02 per cent by weight of sodium in the form of fine dust-like particles. The solution was mixed with 5 pounds of Hyflo Supercel (a diatomaceous earth, principally silica) and was filtered. The solution was analyzed after filtering. It contained less than one part of suspended sodium per million parts of the solution. The filtered solution was heated in vacuum to vaporize and separate volatile ingredients, principally unreacted alpha-methyl styrene, from the polymeric product. The solution was heated in vacuum until the polymer was at a temperature of 200° C. at 20 millimeters absolute pressure. The polymer was cooled and was crushed to a granular form. There was obtained 75.5 pounds of polymer. A portion of the granular polymer was injection molded to form test bars of ⅛ x ½ inch rectangular cross section. These test bars were used to determine the tensile strength in pounds per square inch of initial cross section the per cent of its original length by which the product could be elongated under tension before breakage occurred, and the impact strength of the product. The procedure employed in determining the tensile strength and the per cent elongation values were similar to that described in ASTM D638-44T. The procedure employed in measuring impact strength was similar to that described in ASTM D256-43T. Other molded test pieces of the polymeric product were used to determine the heat distortion temperature by a procedure of Heirholzer and Boyer ASTM Bulletin No. 134 of May, 1945, and to determine, under the action of an alternating current having frequencies of $10^2$ cycles and $10^8$ cycles per second, the dielectric constant and the per cent power factor in accordance with procedures described in ASTM D150-44T. A viscosity characteristic for the polymer was determined by dissolving a portion of the polymeric product in toluene to form a solution containing 10 per cent by weight of said product and determining the absolute viscosity in centipoises at 25° C. of the solution. Molded articles prepared from the polymer were clear and colorless. The properties determined for the polymer were as follows:

Tensile strength _____lbs./sq. in__ 7180
Elongation _____per cent__ 1.1
Notched impact strength _____ft.-lbs__ 0.028
Unnotched impact strength _____ft.-lbs__ 1.8
Heat distortion temperature _____° C__ 153
Viscosity (10% solution in toluene 20° C.)
    cps__ 16
Intrinsic viscosity _____ 0.71
Dielectric constant _____ 2.55
Power factor at $10^2$ cycles ____per cent__ 0.0255
Power factor at $10^8$ cycles _____do____ 0.0368

*Example 6*

A charge of 72.5 grams of a batch of alpha-methyl styrene, together with 2.7 grams of a granular alloy of sodium and potassium was sealed under vacuum in a 1.5 inch diameter glass tube 6 inches long. The alloy employed in the experiment was prepared by heating a mixture of 7.5 parts by weight of sodium and 0.7 part of potassium in a closed container in admixture with white mineral oil until the metals were melted, then vigorously agitating the mixture while cooling the same to solidify the alloy in the form of fine granules. The mixture of the alpha-methyl styrene and the alloy was agitated and maintained at a temperature of 15° C. over a period of 11.5 hours. The induction time i. e. the time required until the increase in the viscosity of the liquid in the tube was observed, was 7.5 hours. The polymerization time was 4 hours. The reaction mixture was removed from the tube, was mixed with 4 grams of Hyflo Supercel, a diatomaceous earth, and was filtered through a fritted glass filter to remove the solid materials. The filtrate, i. e. the solution of polymeric alpha-methyl styrene in monomeric alpha-methyl styrene, was heated in vacuum over a period of 2 hours until the polymer was at a temperature of 190° C. at 1 millimeter absolute pressure to remove the unreacted alpha-methyl styrene. The polymer was cooled and was crushed to a granular form. There was obtained 28.1 grams of polymeric alpha-methyl styrene. A solution of toluene containing 10 per cent by weight of the polymer had an absolute viscosity of 23 centipoises at 25° C. This corresponds to an intrinsic viscosity in toluene of 0.83. The rate of polymerization was 9.7 per hour.

*Example 7*

A charge of 72.5 grams of the batch of the alpha-methyl styrene mentioned in Example 6, together with approximately 1.96 grams of metallic potassium in the form of 5 bars of the potassium each having the dimensions 0.3 x 0.3 x 4.5 centimeters, as catalyst, was sealed under vacuum in a 1.5 inch diameter glass tube 6 inches long. The tube was agitated and maintained at a temperature of 15° C. over a period of 12.5 hours. The induction time was 7.5 hours. The polymerization time was 5 hours. The reaction mixture was removed from the tube. The liquor was separated from the unreacted bars of the potassium. The liquor was mixed with 4 grams of a diatomaceous earth and was filtered to remove the solid material together with dust-like particles of the potassium. The filtered liquor was heated in vacuum to separate the unreacted alpha-methyl styrene from the polymer. There was obtained 35.8 grams of polymeric alpha-methyl styrene. A solution of toluene containing 10 per cent by weight of the polymer had an absolute viscosity of 16.1 centipoises at 25° C. This corresponds to an intrinsic viscosity in toluene of 0.71. The rate of polymerization was 9.9 per cent per hour.

*Example 8*

A charge of 72.5 grams of the batch of the alpha-methyl styrene mentioned in Example 6, together with approximately 2 grams of metallic lithium in the form of 4 bars of the lithium, each having the dimensions 0.4 x 0.4 x 3.5 centimeters, as catalyst, was sealed under vacuum in a glass tube 1.5 inches in diameter by 6 inches long. The mixture was agitated and maintained at a temperature of 15° C. over a period of 52.5 hours. The induction time was 44.5 hours. The polymerization time was 8 hours. The polymer was recovered by procedure similar to that described in Example 7. There was obtained 21.4 grams of polymeric alpha-methyl styrene. A solution of toluene containing 10 per cent by weight of the product had an absolute viscosity of 7.5 centipoises at 25° C. This corresponds to an intrinsic viscosity in toluene of 0.45. The rate of polymerization was 3.7 per cent per hour.

I claim:

1. A process for making a normally solid homopolymer of alpha-methyl styrene which comprises polymerizing monomeric alpha-methyl styrene in the presence of at least one alkali metal catalyst selected from the group consisting of sodium, potassium and lithium, alloys of potassium and lithium with each other, and mixtures and alloys of sodium with at least one of the elements potassium and lithium, in a reaction zone where the mixture is maintained at a temperature of from 0° to 30° C. to effect polymerization and form a liquid solution of polymer in monomeric alpha-methyl styrene, withdrawing a portion of the reaction liquor from said reaction zone through a filter while retaining the principal portion of the non-chemically combined alkali metal catalyst in the residual reaction mixture and adding monomeric alpha-methyl styrene to the residual reaction mixture.

2. A process for making a normally solid homopolymer of alpha-methyl styrene which comprises feeding monomeric alpha-methyl styrene into contact with at least one alkali metal catalyst selected from the group consisting of sodium, potassium and lithium, alloys of potassium and lithium with each other and mixtures and alloys of sodium with at least one of the elements potassium and lithium, dispersed in a reacting mixture comprising essentially alpha-methyl styrene, polymeric alpha-methyl styrene and said alkali metal catalyst, maintained at a polymerization temperature of from 0° to 30° C., periodically withdrawing a portion of the reaction liquor containing from 15 to 35 per cent by weight of polymer through a filter while retaining the principal portion of the non-chemically combined alkali metal catalyst in the residual reaction mixture, adding monomeric alpha-methyl styrene to the residual reaction mixture and recovering the polymer from said reaction liquor.

3. A process as described in claim 2, wherein the polymer is recovered by mixing the reaction liquor with a minor proportion of a finely divided inert solid material which is insoluble in said liquor, separating the solid materials from the liquid and recovering the polymer from the liquid.

4. A process for making a normally solid homopolymer of alpha-methyl styrene which comprises feeding monomeric alpha-methyl styrene into admixture with at least one granular alkali metal catalyst selected from the group consisting of sodium, potassium and lithium, alloys of potassium and lithium with each other, and mixtures and alloys of sodium with at least one of the elements potassium and lithium, dispersed in a reacting mixture comprising essentially alpha-methyl styrene, polymeric alpha-methyl styrene and said alkali metal catalyst, maintained at a polymerization temperature of from 0° to 30° C., periodically withdrawing a portion of the reaction liquor containing from 15 to 35 per cent by weight of polymer through a filter, together with dust-like particles of the alkali metal catalyst, while retaining the granules of said catalyst in the residual reaction mixture, mixing said reaction liquor with a finely divided inert solid which is insoluble in said liquor, separating the solid materials from the liquid, heating the liquid to distill and separate unreacted alpha-methyl styrene from the polymer, feeding the recovered alpha-methyl styrene into admixture with the residual reaction mixture, together with an additional amount of alpha-methyl styrene, in total amount corresponding approximately to the weight of the reaction liquor withdrawn and continuing the process as described above.

5. A process for making a normally solid homopolymer of alpha-methyl styrene which comprises continuously feeding monomeric alpha-methyl styrene into contact with granules of at least one alkali metal catalyst selected from the group consisting of sodium, potassium and lithium, alloys of potassium and lithium with each other, and mixtures and alloys of sodium with at least one of the elements potassium and lithium, dispersed in a reacting mixture comprising essentially alpha-methyl styrene, polymeric alpha-methyl styrene and said alkali metal catalyst, maintained at a polymerizing temperture of from 0° to 30° C., continuously withdrawing reaction liquor containing from 15 to 35 per cent by weight of polymer through a filter, together with dust-like particles of the alkali metal catalyst while retaining the granules of said catalyst in the residual reaction mixture, continuously mixing said reaction liquor with a minor proportion of a finely divided inert solid material which is insoluble in said liquor and separating the solid material from the liquid, continuously feeding the liquid to a devolatilizing zone where it is heated to distill and separate the alpha-methyl styrene from the polymer, continuously withdrawing the heat-plastified polymeric alpha-methyl styrene from said devolatilizing zone and continuously feeding the recovered monomeric alpha-methyl styrene into admixture with the residual reaction mixture together with additional alpha-methyl styrene in total amount corresponding approximately to the weight of the reaction liquor withdrawn.

6. A process as described in claim 2, wherein the alkali metal catalyst contains from 1 to 99 per cent by weight of potassium and from 99 to 1 per cent by weight of sodium.

7. A process as described in claim 4, wherein the alkali metal catalyst contains from 1 to 99 per cent by weight of potassium and from 99 to 1 per cent of sodium.

8. A process as described in claim 4, wherein the alkali metal catalyst is lithium.

9. A process as described in claim 4, wherein the alkali metal catalyst is sodium.

10. A process as described in claim 4, wherein the alkali metal catalyst is potassium.

THOMAS E. WERKEMA.

References Cited in the file of this patent
UNITED STATES PATENTS

| Number | Name | Date |
| --- | --- | --- |
| 2,458,378 | Herbolsheimer | Jan. 4, 1949 |
| 2,621,171 | Jones | Dec. 9, 1952 |